Aug. 13, 1940. K. C. D. HICKMAN 2,210,926
VACUUM DISTILLATION PROCESS
Filed Sept. 5, 1936 2 Sheets-Sheet 1
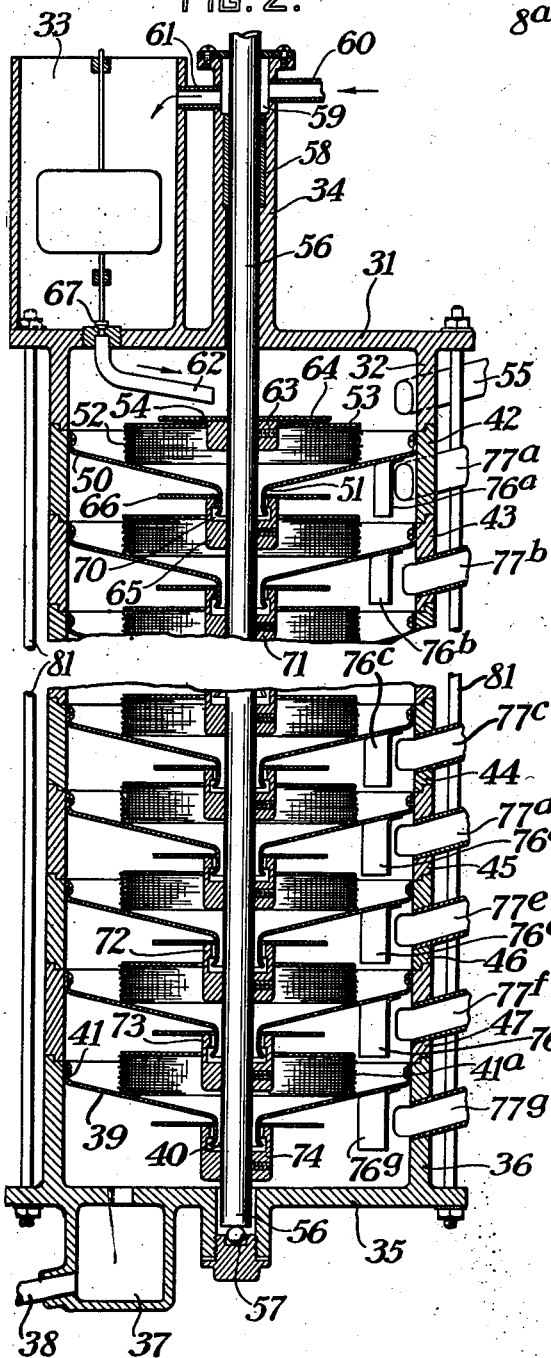
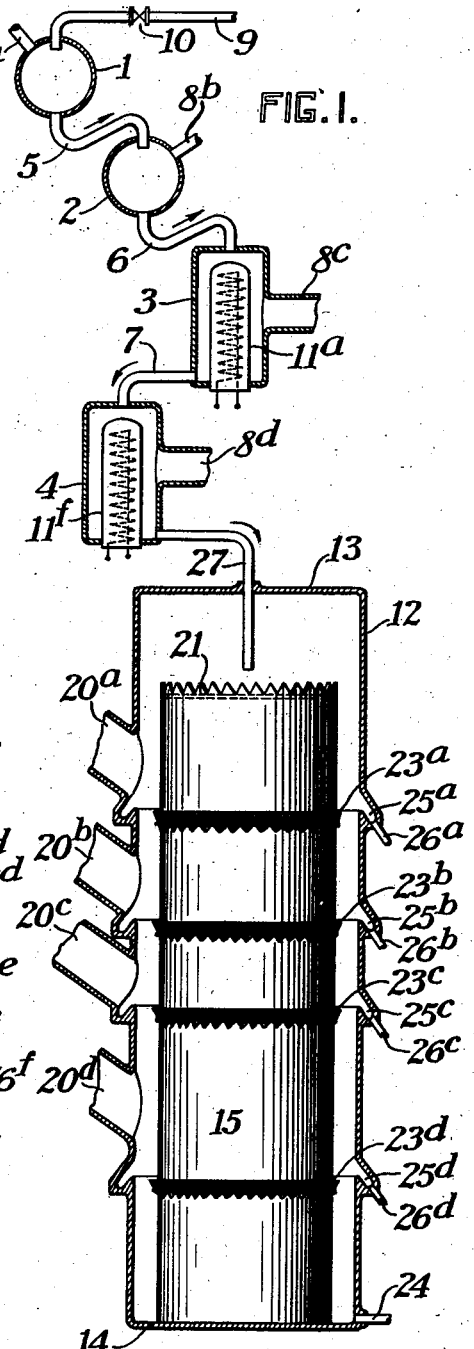
INVENTOR.
Kenneth C.D. Hickman
BY
ATTORNEYS

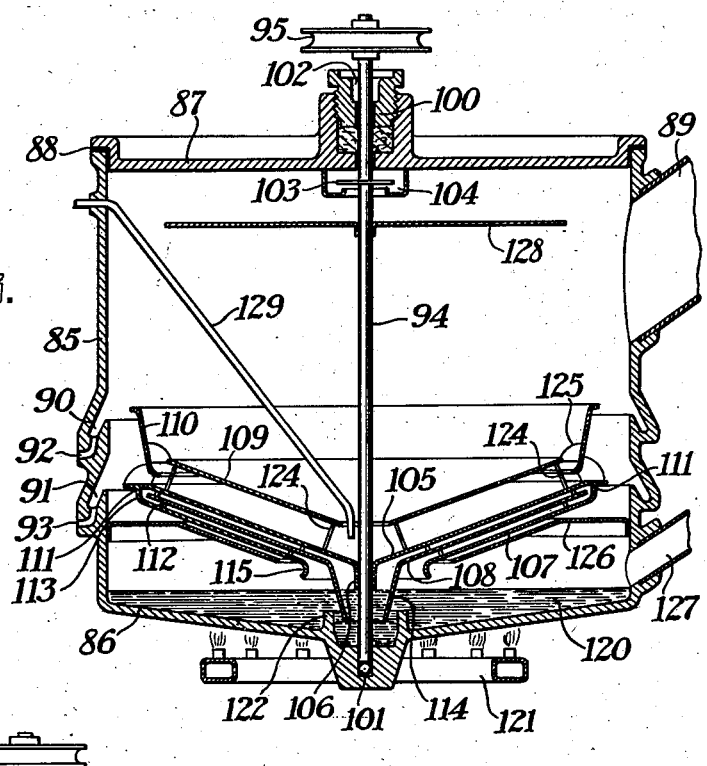
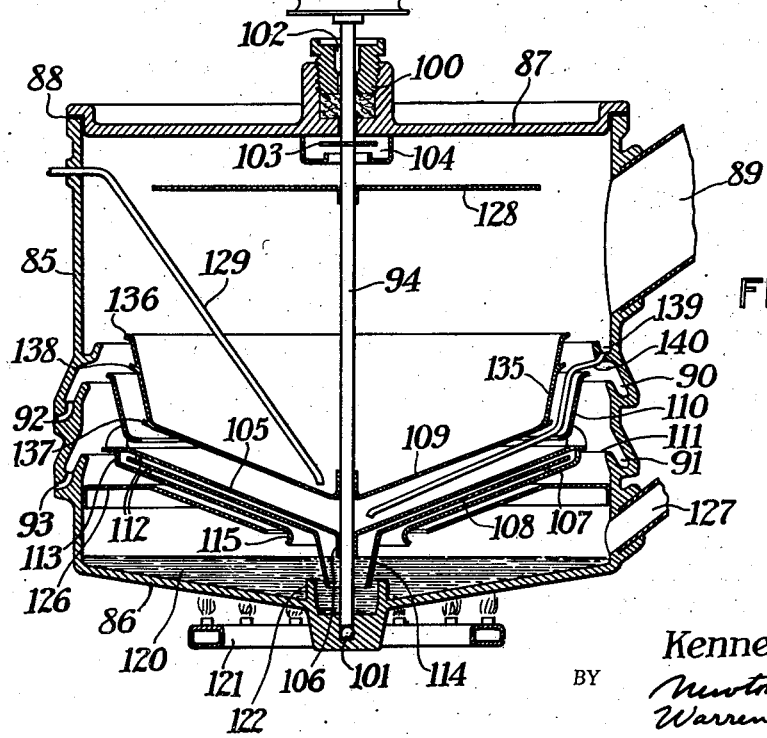

Patented Aug. 13, 1940

2,210,926

UNITED STATES PATENT OFFICE 2,210,926

VACUUM DISTILLATION PROCESS

Kenneth C. D. Hickman, Rochester, N. Y., assignor, by mesne assignments, to Distillation Products, Inc., Rochester, N. Y., a corporation of Delaware Application September 5, 1936, Serial No. 99,631
In Great Britain July 6, 1936

6 Claims. (Cl. 202—52)

This invention relates to improvements in processes of high vacuum and, particularly, molecular distillation of mixtures containing substances having antirachitic activity such as fish oils.

In my U. S. Patent 1,925,559 I have described a process of molecular distillation of animal and vegetable oils to obtain concentrated fat soluble vitamin distillates. This process made possible the preparation of superior vitamin concentrates in a purer form and at a considerably smaller expense than was possible with other types of purification processes. I have further investigated the purification of vitamins by this method and have found that while vitamins A and E were obtained from appropriate oils as distillates in amounts corresponding to the quantity present in the source material, considerable proportions of vitamin D or antirachitic material were lost during the distillation of oils containing this particular vitamin. It was further found that the loss of this potent substance was due to thermal decomposition and to a lesser extent to oxidation.

This invention has for its object to provide a process of high vacuum, molecular or pseudo molecular distillation which enables improved recovery of substances having antirachitic activity from mixtures containing them. Another object is to prevent thermal decomposition and/or oxidation of substances having antirachitic activity during high vacuum distillation. Another object is to provide an improved process of molecular distillation of fish oils by which antirachitic substances can be substantially purified without important loss. A further object is to provide new therapeutic agents having substantial antirachitic activity. Other objects will appear hereinafter.

These objects are accomplished by the herein described invention which, in its preferred embodiment, comprises heating the substance to be distilled for only a short period of time and preferably while it is in such a physical state that rapid vaporization of vitamin can take place. To further prevent destruction complete degassing of the oil, in order to remove reactive gases and oxidizing agents, is desirable.

In the following examples and description I have set forth several of the preferred embodiments of my invention, but it is to be understood that they are included for the purpose of illustration and not as a limitation thereof.

In carrying out the molecular distillation of fish oils containing vitamin D it was found that the antirachitic factor was obtained as a distillate at between 130° and 180° C., the main portion distilling in maximum amounts at about 155° C. Neighboring fractions contained small amounts of the same material, but all other fractions were devoid of the substance. Biological analysis of the undistilled residue and of all fractions, indicated that a considerable proportion of the antirachitically active material had been lost. Repeated distillations substantiated the above facts. It was assumed that the potent material had been lost due to thermal decomposition, and I therefore designed apparatus which would enable a high rate of distillation with a much shorter heating period. Analysis of fractions produced in this manner resulted in the discovery that while the antirachitic potency of the 130°-180° C. fractions had increased somewhat, a new antirachitic compound was being obtained in large amounts at a temperature between 190° and 260° C., the main portion distilling in maximum amounts at 205°-240° C. It is not definitely known what caused the destruction of this new compound in all distillation processes heretofore carried out, but the above facts strongly indicate that it was due to inefficient vaporization requiring such a long heating period that the substance could not survive the treatment.

Calciferol is known to be completely decomposed to an inactive substance by heating to 185° C. Since the high-boiling antirachitic substance probably has a somewhat similar structure, it is not surprising that it should be decomposed by heating for too long a period at a similar high temperature.

Distillation under high vacuum and especially molecular distillation is different from other types of distillation in that boiling does not take place, evaporation occurring only from the surface of the material distilled. Unless the evaporative surface is rapidly renewed the surface quickly becomes depleted and vaporization ceases until new molecules arrive at the surface, which action takes place slowly. To improve the rate of distillation the material has been caused to flow in a film by gravity down the surface of a heated column. However the turbulence caused by the slow rate of flow is insufficient to cause rapid renewal of the vaporizing surface and for this reason thermal destruction of the new antirachitic substance took place as well as partial destruction of the lower distilling vitamin D material. I have found for instance that when the oil to be distilled is thoroughly degassed that the new antirachitic substance has a half life of less than about 2 minutes at above 220° C. and less than 1 minute at 240° C. To distill without substantial decomposition it is therefore desirable not to employ a heating period of over 30 seconds at 220° C. or 15 seconds at above 240° C., although the longer periods named above can be used with temperatures in the lower range such as 185°–200° without decomposition or at the higher temperatures if partial decomposition is to be tolerated. Prior known vacuum distillation processes would not enable evaporization to take place in such a short period of time.

In order to avoid decomposition of antirachitically active substances during high vacuum distillation I therefore subject the crude animal oil such as a fish oil to short period distillation while it is in such a condition that rapid vaporization takes place. This result can be affected by the apparatus hereinafter described in which the oil is rapidly conveyed through the still in a thin film or sheet or is subjected to distillation temperature while the evaporating surface is rapidly renewed or is in a condition such that rapid and efficient vaporization can take place.

In order to further protect against destruction of both forms of antirachitic substance and especially the new higher distilling variety I have found that it is desirable, although not necessary, to subject the oil to a thorough degassing treatment in order to remove all absorbed oxygen, peroxides, acids etc. Conventional degassing can be used, but it has been found that it does not remove all agents which react with or destroy the antirachitic substances present in the oil and I therefore prefer to employ the improved degassing treatment disclosed below.

Vitamin A which is naturally present in fish oils acts to protect both forms of vitamin D by absorbing oxygen, and it is present in such quantities that little oxygen is left to destroy the vitamin D. The vitamin A combines with oxygen in two stages, first forming peroxides or unstable addition products, and after a lapse of time or a rise of temperature these materials react to form true oxidation products. Where the true oxidation products are formed suddenly as a result of rise in temperature, the oxygen is made temporarily available in an extremely active form. Consequently the vitamin A which has protected the antirachitic substances during storage becomes an agent in the destruction of antirachitic substances during distillation, unless the oil is thoroughly degassed before distillation. In addition to thorough oxygen removal the presence of an antioxidant such as trihydroxy benzene is of value in preventing this vitamin A effect.

Degassing processes heretofore known merely involved vacuum treatment until the bulk of the absorbed gas had been removed. I have found that such treatment does not remove absorbed gases and volatiles sufficiently to avoid destruction during distillation. Oil, even when under a high vacuum, retains gases to such an extent that the gas pressure in the oil is many hundreds of times greater than the pressure of the gas above the oil surface. Thus I have found that on subjecting a fish oil to degassing until a pressure of .001 mm. is reached, that if the oil is sealed in a chamber under this low pressure that the gases are given off and soon destroy the vacuum. Degassing processes heretofore known were employed with a view to removing absorbed gases which would otherwise be given off and hinder the distillation rate. For a material to be distilled in a molecular vacuum it is necessary only that the residual gas outside the oil shall be in concentration sufficiently low to give no hindrance to the distilling molecules. Even though the pressure of gas in the degassed oil was many hundreds of times that outside the oil no hindrance to distillation took place unless the gas came out of the oil faster than the pumps could carry it away. For this reason degassing in known manner was entirely satisfactory for the purpose in view. In those cases where the oxygen can react with the valuable constituents of the oil, or the water can catalyse its pyrolysis, it is necessary to degas the oil much more thoroughly than required for mere distillation.

The rate at which gases are given off during degassing decreases exponentially with increase in thickness of the oil layer and also decreases at a high rate with increase of viscosity. Thus it has been found that oils can be subjected to high vacuum in layers 1 mm. thick at elevated temperatures and yet retain an internal pressure of permanent gas hundreds of times higher than the vacuum to which they were exposed. Many passages through the vacuum are necessary to bring the internal and external pressures into equilibrium. While thorough degassing in this manner is possible over a prolonged period of time it has been discovered that oils can be degassed rapidly and thoroughly if they are spun at high speeds in thin films by forces greater than gravity such as centrifugal action.

The degassing treatment outlined above enables the vitamin content of the oil to withstand a rougher distillation treatment, but substantially the same results can be accomplished if a heating period in the lower portion of the range disclosed is used with oil degassed in the ordinary manner. Thus if the high boiling vitamin D will survive substantially unharmed for 30 seconds at a certain temperature if thoroughly degassed, it will survive for about 15 seconds if only normally degassed. Therefore by the rapid distillation, which constitutes the main subject of this invention, the vitamin can survive the distillation treatment even with poor degassing.

In order to enable a clearer understanding of my invention I have illustrated in the accompanying drawings in which like numbers refer to like parts, apparatus which enables thorough degassing and short period distillation.

Fig. 1 is a diagrammatic elevation partly in section of a suitable degassing and distillation apparatus;

Fig. 2 illustrates a sectional elevation of a preferred form of degassing apparatus;

Fig. 3 illustrates a sectional elevation of a preferred type of short period distillation apparatus and;

Fig. 4 illustrates a sectional elevation of a modification of the still illustrated in Fig. 3.

Referring to Figure 1, reference numerals 1, 2, 3 and 4 designate gas tight chambers connected in series by conduits 5, 6 and 7. Each chamber being provided with conduits 8 and communicating with vacuum pumps (not shown). Numeral 9 designates a conduit provided with valve 10 through which oil to be distilled is introduced into the system. Chambers 3 and 4 are provided with heated internal, centrally located, dome shaped cylindrical columns 11a and 11f which are equipped with suitable electrical heating means as shown. Reference numeral 12 designates a cylindrical still casing provided with a gas tight top plate 13 and base plate 14 upon which is mounted a cylindrical vaporizing column 15. Casing 12 is provided with conduits 20 a—d which connect to high vacuum pumps (not shown). Column 16 is provided with a top plate 21 which in combination with the upper serrated wall of 15 forms a shallow reservoir at the top of the vaporizing column. The vaporizing column is provided with internal electrical heating units arranged in such a manner that different sections of the column can be heated to different temperatures independently of the other sections. The column is provided with metal gauze collars 23 a—d, the lower serrated portions of which are in contact with the surface of the column and the upper portions of which are slightly greater in diameter, thus in conjunction with the walls of the column, forming an annular trough with a serrated bottom portion. Still casing 12 is provided with a conduit 24 through which undistilled residue is withdrawn and with concentric gutters 25 a—d provided with withdrawal conduits 26 a—d, the gutters being spaced on the walls of 12 at a point opposite the lowest portion of the various temperature zones on column 15. Conduit 27 serves to convey liquid to be distilled from degasser 4 into the shallow reservoir at the top of column 15.

Referring to Figure 2 numeral 31 designates a circular plate upon the lower portion of which is integrally mounted a cylindrical collar 32 and upon the upper portion a cylindrical reservoir 33 and an elongated bearing 34. Numeral 35 designates a cylindrical plate integral with a cylindrical collar like section 36 and a sump 37 provided with a withdrawal conduit 38. A cone shaped partition 39 having a cylindrical center portion 40 and lip 41 supports a screen 41a and is mounted upon and supported by the walls of section 36. Reference numerals 42—47 designate cylindrical sections mounted upon each other to form a cylindrical column. Since each of these sections is substantially identical in design, a detailed description of section 42 only, will be given. Numeral 50 designates a cone shaped partition rigidly mounted upon the wall of section 42, the central portion 51 thereof being in the form of a cylinder. Upon the upper side of cone 50 is mounted a cylinder of gauze wire 52 the lower edge of which is fastened to the surface of 50 and the upper edge of which is integral with circular plate 53 having a circular centrally located opening 54. A conduit 77a integral with section 42 communicates with a vacuum pump (not shown).

Reference numeral 56 designates a shaft extending the length of the assembly and supported by bearings 34 and 57, bearing 34 being provided with a stuffed gland 58 and an oil filled reservoir 59 to prevent entry of air into the apparatus. A conduit 60 conveys oil to be degassed into reservoir 59 from which it flows through conduit 61, reservoir 33 and conduit 62 into the degassing system the rate of flow being controlled by float valve 67. Upon shaft 56 is rigidly mounted a collar 63 which is integral with a circular plate 64, the collar extending through the circular opening 54 in plate 53, but in spaced relation to the latter. Numeral 65 designates a collar integral with circular plate 66 which is rigidly mounted upon shaft 56 and which has a recessed portion 70 slightly larger in diameter than the cylindrical portion 51 of partition 50. A small reservoir is thus provided into which the cylindrical portion 51 of partition 50 extends. Reference numerals 71—74 designates similar collar and plate assemblies mounted upon the shaft 53, in relation to the partition in the same manner as described in detail with collar 65.

In assembling the apparatus shaft 56 is placed in the bearing 57 of plate 35. Collar 74 is then fixed on the shaft and partition 39 slipped over the shaft and mounted upon the walls of section 36, collar 74 and partition 39 being so positioned that contact between the two is avoided. It is desirable in mounting partition 39 to provide a substantially gas tight joint between the annular portion 41 and the inside wall of section 36. Section 47 is then placed on top of section 36 accurate centering being easily accomplished by providing a rabbeted joint which is provided with a gasket or smeared with a suitable sealing compound in order to make it gas tight. The different sections and collar assemblies are assembled successively in the same manner, care being taken in each case that baffles 76 a—g are directly between the evacuation conduits 55 and 77 a—g and shaft 56. The entire assembly is securely held together by draw bolts 81 mounted in holes around the periphery of plates 31 and 35.

Referring to Figure 3 reference numeral 85 designates a cylindrical still casing provided with an integral base 86 and a removable top plate 87 which is kept in gas tight contact with the upper edge of 85 by a gasket 88. The wall of casing 85 is provided with a large conduit 89 which connects with high vacuum pumps (not shown) and with two annular gutters 90 and 91 the latter draining into withdrawal conduits 92 and 93 respectively. A drive shaft 94 provided with a pulley 95 extends the length of the still and is housed in, and supported by bearings 100 and 101, the upper bearing 100 being provided with a packing gland and a small reservoir 102 filled with low vapor pressure oil in order to prevent entry of gas. Any oil leaking through the bearing falls onto a circular disc 103 and is whirled into retaining cup 104 fastened upon the lower wall of plate 87. A conically shaped plate 105 is securely fastened to shaft 94 at 106 and serves to support and rotate cone shaped plates 107, 108, 109, and 110 by motion transmitted from shaft 94. The periphery of conical plate 107 is integral with the outside portion of plate 105 at the point indicated by numeral 111. Cone shaped plate 108 is disposed between and equidistant from the surfaces of plates 105 and 107 and is rigidly held in that position by welded spacers 112 approximately perpendicular to the surfaces of the plates. The upper periphery of plate 108 does not extend to the outer curved portion 113 of plate 107 and there is therefore an annular passage connecting the space between plates 105 and 108 and the space between plates 107 and 108. The lower portion 114 of plate 108 extends downwardly through the opening formed by the flared lip portion 115 of plate 107 and dips into a body of low vapor pressure heating fluid 120 which is heated by exterior gas burner 121. An annular baffle 122 prevents extensive motion of liquid 120.

Conical plate 109 has a centrally located hole through which shaft 94 and conduit 129 protrude and is maintained substantially parallel to plate 105 by welded spacers 124 through which the motion of rotation is also transmitted. Plate 110 is maintained in the position shown and rotated by force transmitted through welded spacers 125. A baffle 126, integral with the wall of casing 85 is disposed parallel to, but out of contact with plate 107 and serves to substantially isolate the heating zone from the rest of the still. The zone thus formed is evacuated by means of vacuum pumps (not shown) connected to conduit 127. A false roof 128 in the form of a round disk is mounted upon shaft 94 and serves to throw vapors condensed thereon or dropping from top 87 onto the wall of casing 85 down which they flow into trough 90. Liquid to be distilled is introduced through conduit 129 onto the upper surface of plate 105. It is seen from the description that the entire assembly of plates 107, 108, 109 and 110 is mounted upon and rotated by plate 105 which is supported and rotated by shaft 94.

The construction of the apparatus shown in Figure 4 is substantially identical to that shown in Figure 3 except that plate 109 is mounted upon shaft 94 and is provided with an inclined edge portion 135 which is flared at the top 136 and is provided with annular raised portions 137 and 138. Conduit 129 empties onto the top of plate 109 instead of the top of plate 105 as shown in Figure 3. An additional annular trough 139 is shown on the wall of the still casing 85, which drains into conduit 140 whch empties the liquid onto the top of plate 105. The mode of mounting and rotating plates 107, 108, and 110 is substantially the same as that described in connection with Figure 3 as is also the location and arrangement of other parts not mentioned.

In operation employing the apparatus illustrated in Figure 1 vacuum pumps connected to conduits 8 and 20 are started and valve 10 is opened allowing a steady stream of material to be distilled, such as a fish oil, to flow into chamber 1. Due to the low pressure the gas absorbed in the oil expands to such an extent that the oil bursts or explodes into droplets, the gas being removed through the vacuum conduit 8a. The oil then flows through trap 5 into chamber 2 which is maintained at a lower pressure and where a similar action takes place. The oil then flows through conduit 6 onto the warm column 11a where it is subjected to a still lower pressure in a slightly heated condition. It then flows through conduit 7 onto heated column 11f down which it flows as a thin film, the internal gas pressure of the oil being lowered to about that pressure used during molecular distillation. The oil then flows through conduit 27 onto the top of distilling column 15. In order to maintain chambers 1 and 2 and 3 at different pressures conduits 5 and 6 are U shaped to maintain a body of oil which acts as a trap and prevents passage of gas. No such provision is necessary with conduit 7 since the pressure in chambers 3 and 4 is so low that the resistance to gas flow or the gaseous friction is so great that different pressures can exist in connected chambers without undesirable passage of gas.

The thoroughly degassed oil flowing from conduit 27 falls into the reservoir formed at the top of column 15 by plate 21 and overflows at the serrated edge flowing down the outside wall of column 15 in a relatively thin film. The first portion of the column down to the first distributing ring 23a is heated to a temperature sufficient to remove vitamin A alcohol and if desired the low boiling vitamin D and therefore should be between about 110 and 160° C. The next section is heated to about 165—190° at which temperature the balance of low boiling vitamin D, small amounts of vitamin A in the ester form and traces of the high boiling vitamin D distill. At this stage large amounts of gas and volatiles are given off and this section of the still should be provided with higher capacity pumps. The third section of the column is heated to about 195–215° C. at which temperature large amounts of vitamin A esters and the higher boiling vitamin D are recovered. The fourth section heated to 220°–260° C. serves to remove residual vitamins. The last section of the still can be heated to a higher temperature and the body of the oil distilled if desired.

Due to the construction of this gravity flow type of still the successive heating zones immediately follow one another on a single column so that the oil is not delayed in a heated state in passing from one distillation stage to another. The column is relatively short so that the heating period during passage over each individual heating unit is small. For practical operation the maximum length of the third heating unit (between 23b and 23c) is about 12 inches and the other units are in proportion as shown. There is of course no limit to the diameter of the still and it can be made larger to handle a greater volume of distilland. Due to the short heating period used this apparatus enables useful separation of the new substance, but it does not entirely avoid decomposition or give as high a rate of distillation as the other forms disclosed and I therefore prefer to employ the other apparatus illustrated which enable more positive control and gives a faster distillation rate with shorter heating periods.

When employing the apparatus of Figure 3, oil to be distilled and in a degassed condition is admitted into the still through conduit 129, the still having been evacuated to low pressure through conduits 89 and 127. The shaft 94 is rotated and oil falling from conduit 129 onto plate 105 is whirled by centrifugal force to the outer periphery at 105, thrown into gutter 91 and removed through conduit 93. Plate 105 acts as a heated distilling surface and during the passage of the oil thereover in a very thin film it is heated and vitamins vaporized therefrom. Plate 109, preferably located at a distance from plate 105 of less then the mean free path of molecules of residual gas in the distilling chamber, acts as a condensing surface and molecules vaporized from plate 105 are condensed thereon. This condensate is shot to the periphery by centrifugal force and thrown onto cone 110 from which it is thrown into gutter 90 and removed through conduit 92. During rotation of the assembly heating liquid 120 is forced by centrifugal action, up the surface of cone 114, plate 108, and fills the space between plate 108 and 105. The fluid is returned to the original heating fluid body through the channel formed between plates 107 and 108. A continuous circulation of a heating medium in contact with vaporizing plate 105 is thus accomplished. Radiation of heat from condensing surface 109 is increased by blackening the side farthest from the heated vaporizing surface.

The apparatus of Figure 4 operates in substantially the same manner as that of Figure 3 except that the condensing surface is positively cooled by circulating the oil to be distilled over its surface. Fresh degassed oil is led onto the top of condensing plate 109 and is whirled from the periphery 136 into gutter 139 from which it is led onto the center of the vaporizing surface by conduit 140. Vapors condensed on the bottom of plate 109 are thrown to the projecting lip 137 onto 110 and thence into gutter 90. Small amounts of condensate leaking past 137 are thrown into gutter 90 from projection 138. By circulating the incoming oil over the upper surface of condensing element 109 the temperature can be maintained at any desired point.

In operation employing the degassing apparatus of Fig. 2, oil to be distilled is admitted into reservoir 33 through conduits 60 and 61. Float valve 67 allows the oil to flow into conduit 62 at a predetermined rate dependent on the rate of introduction of the oil into conduit 60 and also serves to seal the apparatus when the flow is stopped. The oil falls from conduit 62 onto rotating disc 64 and is thrown by centrifugal force against the walls of 42. The entire apparatus is maintained under a vacuum by pumps connected to conduits 55 and 77 a—g. The rotation of 64 causes the oil to form in a thin sheet, the surface of which is rapidly renewed, resulting in efficient emission of gases. As the oil strikes the walls it is broken into a spray or small droplets further increasing the rate of gas emission. The oil then flows along the upper surface of partition 50, through screen 52 and into 70, from which it is withdrawn and shot over the surface of rotating plate 66. The filming and spraying action is repeated in each section of the degasser and the oil is then withdrawn through conduit 38 in a thoroughly degassed condition and led to a high vacuum still.

Since large amounts of gas are given off in the first stages of the degasser it is desirable to provide them with high capacity pumps. In the last stages relatively small volumes of gas are removed and pumps of lower capacity, but capable of reaching a lower pressure are used. In order to subject the oil to progressively decreasing pressure each stage is sealed from the others by the oil in reservoirs 70 of the elements 65, 71–74, etc. Final pressures in the last stages should be less than 1 mm. and preferably less than .1 mm. such as between .01 and .001 mm. If desired the degasser may be heated at any or all zones with external heating units. Since large amounts of oxygen are present in the first zones it is desirable when treating fish oils or oils containing vitamins to heat only the last zones where the oxygen has been substantially removed. Temperatures below 100° such as about 60° C. are preferable and may increase with decrease in oxygen content of the oil.

When employing the centrifugal degasser and stills illustrated it will be found that the optimum rate of rotation varies with the character of the material distilled such as thermal properties and viscosity and also with the size of the apparatus and the temperature of distillation. Speeds of 500 to 4000 R. P. M. have been found to be most useful for all general purposes, but it is to be understood that slower or higher speeds can be used within the scope of my invention.

In order to further protect against oxidation at the high distillation temperatures, it is often desirable to add an antoxidant to the oil before distillation and preferably before the degassing treatment. Such antoxidants must have a higher avidity for oxygen than the vitamin which it is to protect. A complete disclosure of the mode of applying this expedient is set forth in my application No. 46,957, filed October 26, 1935. The most effective are the hydroxy amino compounds disclosed therein.

The essential operating conditions to be observed in carrying out molecular distillations are well known and have been described by Burch U. S. Patent 1,955,321; Hickman, 1,925,559 and 1,942,858, Washburn "Bur. St. J. Res.," 2 (1929) 478–83, and Bronsted et al. "Philosophical Magazine," 43 (1922) 31–49. As a general rule pressures below .1 mm. and preferably below .01 mm., such as between .005 and .0001, for instance, .001 mm., are employed. Distances separating the distilling and condensing surfaces are preferably less than the mean free path of the molecules of residual gas at the pressure employed. This distance is substantially inversely proportional to the pressure. Distances of less than 10 inches, such as between ¼ and 6 inches have been found to be satisfactory for most purposes.

While I prefer to operate under molecular distillation conditions I have found that the process described enables such a rapid rate of distillation that pseudo molecular conditions can be used, that is, distances of many times the mean free path and pressures up to 1 or 2 mm. can be used, the vapors traveling to the condensing surface by convection and/or diffusion, the path between the surfaces being free and unobstructed as with molecular distillation. While such a process is not true molecular distillation, it is to be understood as being within the scope of my invention.

The temperatures at which vitamins can be distilled extend from 70° to 320° C. The most practical range is from about 90°–250° C. The most optimum range for recovery of the new antirachitic substance is between about 190° and 235° C.

It is apparent that many variations and changes can be made in the above described apparatus to obtain similar results. For instance instead of using a conical revolving surface a disc shaped centrifugal vaporizing surface and similarly shaped condensing surface could be used. Also a revolving drum shaped surface upon which the distilland is spread in a thin film by rollers would accomplish practically similar results. When using a disc centrifugal vaporizing element, condensers can be placed outside of its periphery and the heated oil shot between them, as a thin sheet, by the centrifugal action. Also where several fractions are to be removed successively several such stills may be connected in series, the distilland flowing from one still to another where fractions are removed at progressively higher temperatures. Traveling bands or drums upon which the oil is spread in a thin film can also be used. All of such variations and many others would accomplish quick passage through the still with rapid renewal of evaporating surface and short heating period and I include all modifications giving such a result as being within the spirit and scope of my invention.

Any natural animal oil containing antirachitic substances such as butter, cod liver, halibut liver, sardine, salmon, menhaden, and other fish oils can be distilled in the manner described to yield the new high boiling antirachitic substance. Furthermore, since the treatment described enables improved yields of vitamin A and D it is of considerable value when processing with a view to their recovery.

The new antirachitic substance which I have isolated distills under molecular conditions between 210° and 260° C. as compared with quinizarine green distilling in maximum amount at 220° C. when employed as a distillation indicator in the manner described in my copending application No. 67,332, filed March 5, 1936. That it is, an entirely different compound from calciferol and from vitamin D heretofore recovered from fish oils is indicated by the fact that these two substances distill under molecular conditions in maximum amounts at about 142°–144° C. compared with di propyl diamino anthraquinone, distilling at 145° C. This fact is further indicated by the lack of change of distillation temperature of these two substances after saponification. Saponification of the new antirachitic substance converts it into a material which distills at the same temperature as the low boiling vitamin D, but which still retains antirachitic activity. It would appear that the reasonable explanation of the above facts is that the new substance is composed of esters and the alkali treatment converted them into the low boiling, free alcohol form, however, I do not intend that my invention be restricted to that interpretation. Whether or not the esters or the higher distilling substance occurs naturally in the oil is not known, and although this is the most plausible assumption, it is entirely possible that they are formed during distillation by combination with free acids or with the acids of the glycerides or in some other manner.

The composition of the distillate obtained varies considerably, depending upon the particular conditions selected. If distillation temperatures in the higher portion of the range disclosed are used, a larger amount of the oil itself will distill, or if a wide cut is taken, varying amounts of vitamin A esters will also be present. Such a fraction can be substantially concentrated and much of the vitamin A esters and the diluent oil eliminated by redistillation in the manner described. By separating narrow cuts or fractions, especially in the range between 190° and 200° C., a highly potent concentrate of high boiling vitamin D containing relatively little vitamin A ester may be obtained.

What I claim is:

1. The process which comprises subjecting a fish oil to distillation at a pressure of less than approximately .1 mm. while it is in the form a thin rapidly agitated film, and condensing an anti-rachitic fraction distilling at between 180° and 260° C. upon a surface located in close proximity to the distilling film, the oil being heated to the temperature at which this fraction distills for a period of less than about 2 minutes.

2. The process which comprises degassing a fish oil under a high vacuum at room temperature until gas evolution has substantially ceased, heating the oil to below 100° C., without raising the pressure, until the oil is completely degassed, subjecting the oil to molecular distillation in the form of a thin film and separating a fraction having anti-rachitic activity which distills in maximum amounts at a temperature between about 185° C. and 235° C., the oil being heated at this temperature for a period of less than 2 minutes.

3. The distillation process which comprises heating a thin film of a vitamin containing fish oil at a pressure of less than approximately .1 mm. to a temperature of between about 180° and 260° C. for a period of less than about two minutes and condensing vaporized molecules upon a condensing surface separated from the heated film by substantially unobstructed space.

4. The distillation process which comprises, heating a fish oil in the form of a thin film under a pressure of less than about .1 mm. to a temperature of between about 190° and 240° C. for a period of less than about two minutes and condensing vaporized molecules upon a condensing surface located at a short distance from the heated film of oil and separated therefrom by substantially unobstructed space.

5. The process of preparing a vitamin concentrate from a fish oil containing vitamin which comprises subjecting the oil to short path distillation at a pressure of less than about .1 mm. and separating a vitamin fraction distilling at between 180° and 240° C., the distillation at that temperature being completed in less than about 1 minute.

6. The process of preparing a vitamin concentrate from a fish oil containing vitamins which comprises removing free fatty acids from the oil, subjecting the oil to short path distillation at a pressure of less than about .1 mm. and separating a vitamin fraction distilling at between 180° and 240° C., the distillation at that temperature being completed in less than about 1 minute.

KENNETH C. D. HICKMAN.